(12) United States Patent
Proctor

(10) Patent No.: US 7,408,148 B2
(45) Date of Patent: Aug. 5, 2008

(54) METHOD AND APPARATUS FOR MINIMIZING THE EFFECT OF BASELINE DEPRESSION IN IONIZING RADIATION MEASURING EQUIPMENT

(75) Inventor: Alan Proctor, Knoxville, TN (US)

(73) Assignee: Nucsafe, Inc., Oak Ridge, TN (US)

( * ) Notice: Subject to any disclaimer, the term of this patent is extended or adjusted under 35 U.S.C. 154(b) by 236 days.

(21) Appl. No.: 11/474,633

(22) Filed: Jun. 26, 2006

(65) Prior Publication Data

US 2007/0295898 A1   Dec. 27, 2007

(51) Int. Cl.
*G01D 18/00* (2006.01)
*G12B 13/00* (2006.01)

(52) U.S. Cl. ................................ 250/252.1
(58) Field of Classification Search ........... 250/252.1
See application file for complete search history.

(56) References Cited

U.S. PATENT DOCUMENTS

| | | | |
|---|---|---|---|
| 4,172,226 A * | 10/1979 | Rubin | ............... 250/394 |
| 4,459,479 A | 7/1984 | Smith, Jr. et al. | |
| 4,698,499 A | 10/1987 | Smith, Jr. | |
| 4,825,071 A | 4/1989 | Gadeken et al. | |
| 4,825,073 A | 4/1989 | Smith, Jr. et al. | |
| 5,243,330 A * | 9/1993 | Thuillard | ............... 340/629 |
| 2002/0181662 A1 | 12/2002 | Pfleger | |
| 2003/0178575 A1* | 9/2003 | Mallette | ............... 250/394 |
| 2004/0258189 A1 | 12/2004 | Norman et al. | |
| 2005/0248456 A1 | 11/2005 | Britton, Jr. et al. | |
| 2005/0275545 A1 | 12/2005 | Alioto et al. | |
| 2006/0007006 A1 | 1/2006 | Alioto et al. | |

* cited by examiner

*Primary Examiner*—David P. Porta
*Assistant Examiner*—Mark R Gaworecki
(74) *Attorney, Agent, or Firm*—Luedeka, Neely & Graham, P.C.

(57) ABSTRACT

Methods and an apparatus for reducing the effect of background ionizing radiation depression in vehicle and container monitoring systems due to shielding effects from components of the vehicle or container or modifications thereof. The methods utilize measurements of background radiation in two spectral regions of interest to calculate a normalization constant, and then utilize the normalization constant to normalize measurements in the same regions of interest when a vehicle or container is tested for the presence of a relevant ionizing radiation source such as $^{137}$Cs and $^{76}$Ga. Subtracting the two measurements to calculate a net difference provides a substantially valid measure of radiation counts in one spectral region of interest. Preferably the regions of interest abut or overlap, and preferably the spectral widths of the regions of interest are selected so that the attenuation of radiation counts due to background shielding effects in the two regions of interest is substantially equal.

23 Claims, 7 Drawing Sheets

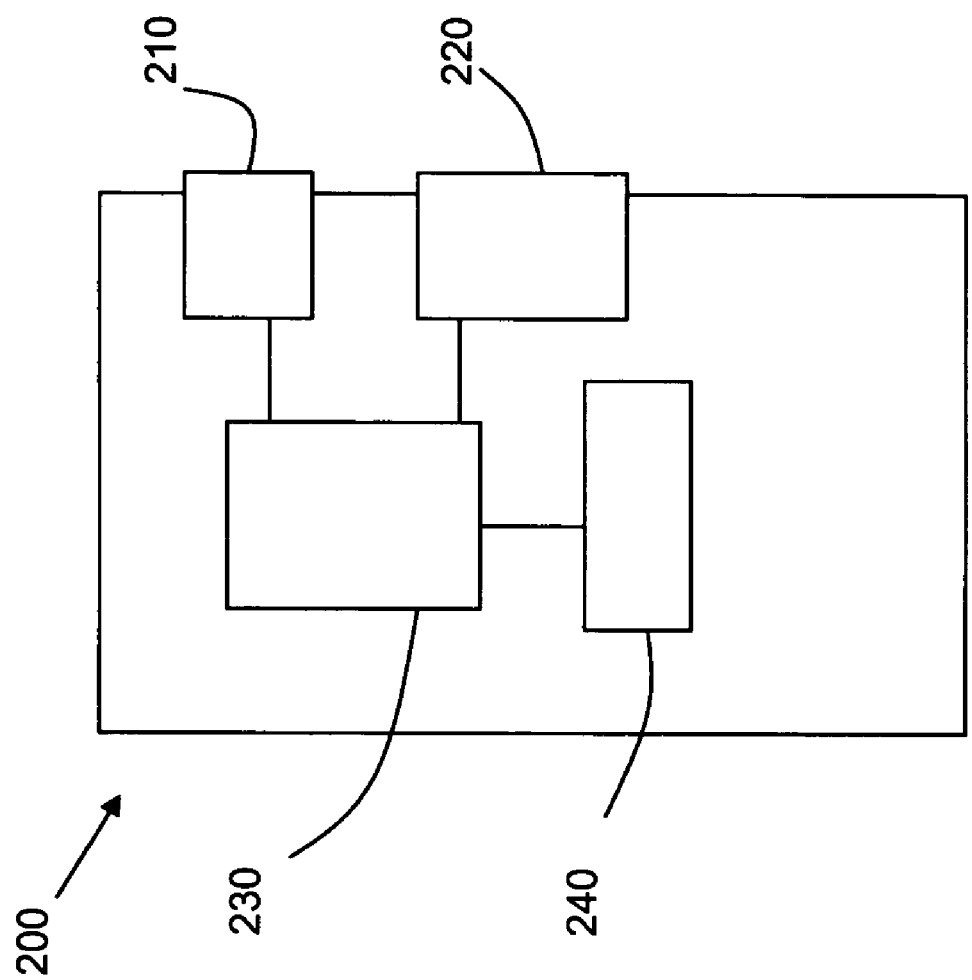

METHOD AND APPARATUS FOR MINIMIZING THE EFFECT OF BASELINE DEPRESSION IN IONIZING RADIATION MEASURING EQUIPMENT

GOVERNMENT RIGHTS

The U.S. Government has rights to this invention pursuant to contract number HSHQPA-05-C-0029 between the Department of Homeland Security and Nucsafe, Inc.

FIELD

This invention relates to the field of radiation detection equipment. More particularly, this invention relates to radiation detection equipment used to monitor personnel entry and exit portals and transportation ports for clandestine conveyance of radiological materials.

BACKGROUND

Large gamma radiation instruments such as portal monitors and other large area detectors are used to examine truck trailers, automobile trunks, shipping containers, packages, luggage, personal effects, and similar items (hereinafter collectively referred to as "containers") to determine whether any radiological material is located therein. These detectors also respond to natural background radiation originating from cosmic, airborne, and terrestrial sources. Under ideal circumstances the measure of radioactivity produced by any radiological material in a container being examined may be determined from the difference between (1) the radiation count rate seen by the detector(s) when the container occupies the survey space of the monitoring system, and (2) the radiation count rate observed when the monitoring system is "empty."

Unfortunately, a complicating effect generally occurs when the container or its transporting vehicle being examined or both are so massive that they shield the detector(s) from viewing background radiation. In such circumstances the observed signal is the sum of detected radiation from any radiological material in the container or vehicle, and a reduced contribution from background radiation. A large vehicle has been shown to reduce the background radiation detected by substantial amounts, as much as ~30%. Because the determination of radioactivity emanating from the container or vehicle is determined by a difference between the "occupied" and "empty" conditions, radioactivity emanating from a radiological source within a container or vehicle may not be reliably detected because the decrease in detected background radiation caused by the massive "sample" offsets the level of the detected emission from the radioactivity in the "sample," resulting in an inaccurate reading. This situation is called "baseline depression" and has been shown to cause significant vulnerabilities in large radiation measuring systems such as portal monitors.

In attempts to overcome the effects of baseline depression in portal monitors, some systems have used measurements of radiation in different spectral "regions of interest." The differences in such measurements have been calculated to compare the total number of gamma rays below an energy threshold versus the total number of gamma rays detected above that energy threshold (up to the maximum detectable energy limit of the detector): Eq'n 1 illustrates this for a gamma spectrum:

$$\text{ROI difference} = \sum_{i=1}^{n} C_i - k \cdot \sum_{i=(n+1)}^{maximum} C_i \quad \text{(Eq'n 1)}$$

In Eq'n 1, the $C_i$'s are the counts in spectrum channels, n is a channel number selected to match the energy threshold, and "k" is a normalization constant that attempts to account for expected differences in background readings between the two regions of interest. An example of an application of this technique are calculations using the sum of all channel contents of the spectral region from 38-1,394 KeV (the region of man-made emitters) and the sum of the spectral regions from 1394-3,026 keV (the region containing mostly counts from naturally occurring gamma emitters). These spectral regions might be selected as regions of interest. The ROI difference of Eq'n 1 might then seem to provide a measure of man-made gamma radiation count. Unfortunately various factors such as detectable high-energy gamma rays, (e.g., 6.13 MeV gamma radiation emitted by $^{16}N$) affect a broad range of energies below the photopeak. Those energies change the spectral shape in a manner that adversely affects the calculation of the normalization constant used in Eq'n 1.

Various other techniques have been proposed for minimizing the effect of baseline depression, but they generally have unacceptable limitations. What are needed therefore are improved methods for reducing the effect of baseline suppression in portal and similar radiation monitoring systems where shielding effects may cloak the presence of radiological material.

SUMMARY

The present invention provides a method for detecting a relevant ionizing radiation source in an environment that includes a potential background ionizing radiation shielding material positioned to obstruct the detection. The method includes a step of selecting at least a first and a second ionizing radiation energy region of interest each having a spectral width. The first ionizing radiation region of interest is selected to include detectable emissions from the relevant ionizing radiation source, and the second ionizing radiation region of interest is selected to have an energy range that does not have substantial emissions from the relevant ionizing radiation source. A further step includes acquiring a first background ionizing radiation measurement in the first ionizing radiation energy region of interest and a second background ionizing radiation measurement in the second ionizing radiation energy region of interest. The first background ionizing radiation measurements and the second background ionizing radiation measurements are each taken substantially in the absence of the relevant ionizing radiation source. The method continues with normalizing the second background ionizing radiation measurement to the first background ionizing radiation measurement to determine a calibration constant.

The method further includes a step of acquiring a first total ionizing radiation measurement in the first ionizing radiation energy region of interest and a second total ionizing radiation measurement in the second ionizing radiation energy region of interest. The first total ionizing radiation measurements and the second total ionizing radiation measurements are each taken in the presence of a potential relevant radiological source and in the presence of a potential background ionizing radiation shielding material positioned to obstruct the detection of the potential relevant ionizing radiation source.

The method continues with a step of applying the calibration constant to normalize the second total ionizing radiation measurement to determine a normalized second total ionizing radiation measurement. The method concludes with subtracting the normalized second total ionizing radiation measurement from the first total ionizing radiation measurement to determine a net difference there between to indicate the presence of the relevant ionizing radiation source.

Also provided is a radiation analysis system for detection of radiation from a relevant ionizing radiation source in a background radiation environment. The apparatus has a radiation detector that is exposed to ambient radiation. The radiation detector is configured to detect at least a first and a second ionizing radiation region of interest. The first ionizing radiation region of interest includes detectable emissions from the relevant ionizing radiation source and the second ionizing radiation region of interest substantially excludes emissions from the relevant ionizing radiation source. A triggering system is provided. The triggering system is configured to generate a first data acquisition trigger when the detector is exposed to ambient radiation comprising the background radiation environment without radiation from the relevant ionizing radiation source and the triggering system is configured to generate a second data acquisition trigger when the detector is exposed to ambient radiation comprising the background radiation environment and a potentially shielded relevant ionizing radiation source.

Also included is a data acquisition system that is in operable communication with the radiation detector and with the triggering system. The data acquisition system is configured to acquire from the radiation detector a background radiation measurement after the triggering system generates the first data acquisition trigger. The background radiation measurement set includes a first background ionizing radiation measurement in the first ionizing radiation region of interest and a second background ionizing radiation measurement in the second ionizing radiation region of interest. The data acquisition system is further configured to acquire from the radiation detector a test radiation measurement after the triggering system generates the second data acquisition trigger. The test radiation measurement includes a first total ionizing radiation measurement in the first ionizing radiation region of interest and a second total ionizing radiation measurement in the second ionizing radiation region of interest.

The radiation analysis system also includes a computer that is in operable communication with the data acquisition system. The computer is configured to normalize the second background ionizing radiation measurement to the first background ionizing radiation measurement to determine a calibration constant. The computer is further configured to apply the calibration constant to normalize the second total ionizing radiation measurement to determine a normalized second total ionizing radiation measurement. The computer is also configured to subtract the normalized second total ionizing radiation measurement from the first total ionizing radiation measurement to determine a net difference there between to indicate the presence of the relevant ionizing radiation source.

BRIEF DESCRIPTION OF THE DRAWINGS

Various advantages are apparent by reference to the detailed description in conjunction with the figures, wherein elements are not to scale so as to more clearly show the details, wherein like reference numbers indicate like elements throughout the several views, and wherein:

FIG. 7 is a schematic diagram of an apparatus for detection of radiation from a relevant ionizing radiation source in a background radiation environment.

DETAILED DESCRIPTION

Described herein are various embodiments of methods for detecting a relevant ionizing radiation source in an environment that includes a potential background ionizing radiation shielding material positioned to obstruct the detection. As used herein, the term relevant ionizing radiation source refers to a material that is an objective for discovery in a radiation analysis system. Examples of relevant ionizing radiation sources are $^{137}$Cs and $^{76}$Ga which may be used to make "dirty bombs." Background ionizing radiation shielding material refers to material that absorbs, reflects, or otherwise disrupts reception of naturally occurring (background) radiation by a radiation detector. Examples of a background radiation shielding material are (1) a component (such as the engine block or the cargo compartment) of a vehicle that is used to transport a relevant ionizing radiation source, and (2) large metal plates that may be installed in a vehicle to deliberately cloak the presence of a relevant ionizing radiation source. In the operation of a radiation inspection station, such as a vehicle monitoring portal, it is often not readily apparent whether background radiation shielding material is present and obstructing the detection of a relevant ionizing radiation source. Consequently, in preferred embodiments the methods for detecting a relevant ionizing radiation source are designed to handle both the circumstance where such shielding material is present, and where shielding material is not present to any significant extent. Hence a desirable apparatus and method should be able to accommodate an environment that includes a potential background ionizing radiation shielding material that may be positioned to obstruct the detection of the relevant ionizing radiation source by a radiation detector.

Radionuclides generate a continuum of detected counts beginning at their highest photopeak energy and continuing to "zero." Natural sources usually generate emissions at higher energies than those produced by man-made radionuclides. As contributions due to man-made radionuclides change, the ratio of counts in "low" energy spectral regions to the counts in "high" energy regions changes as well. A difference based on this ratio is a better indication of man-made radionuclides than gross count rates. When a man-made source is present, a difference between a "low" spectral region and the (weighted) "remainder, high region" will increase. This can be used as an alarm trigger.

Figure 1:
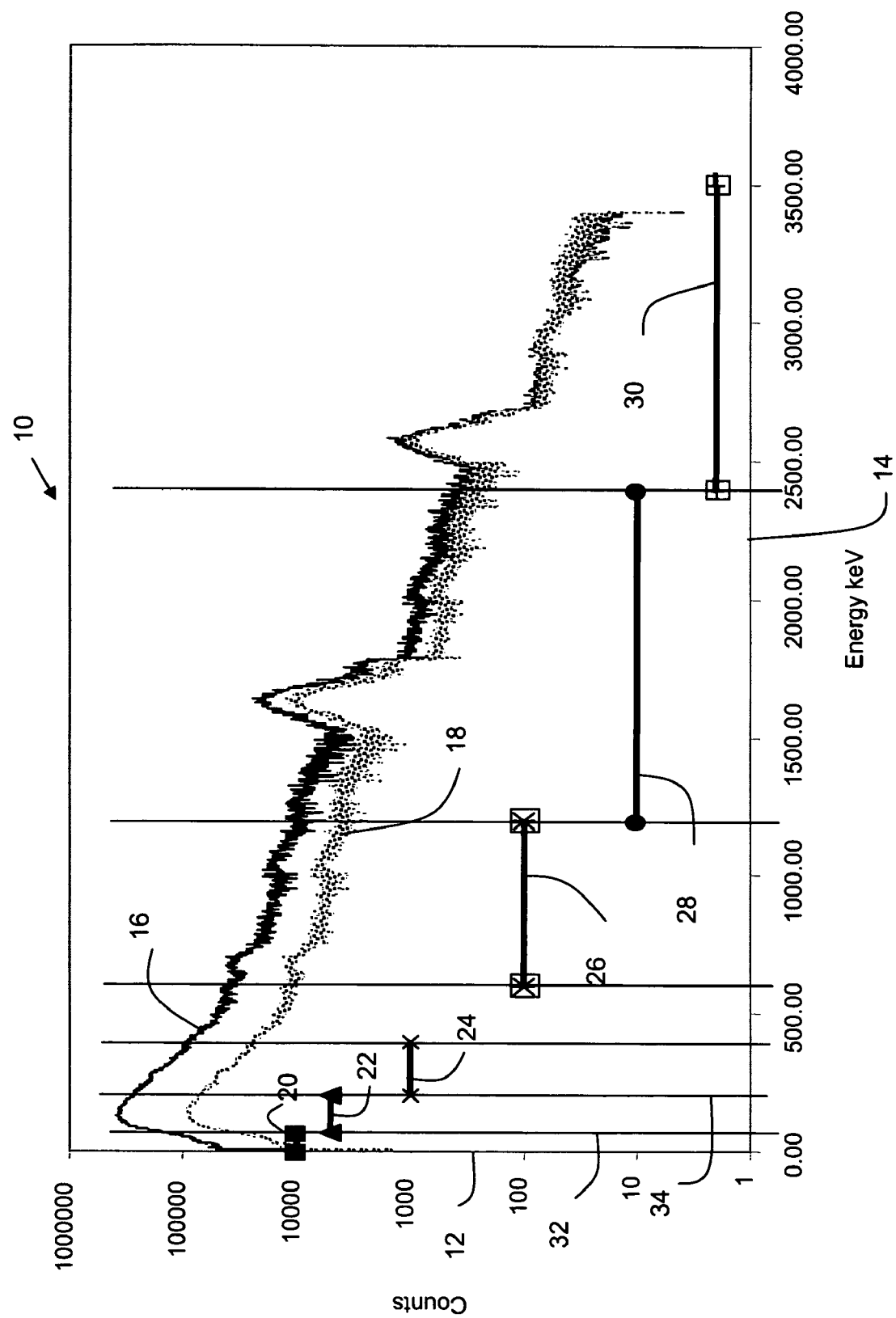
FIG. 1 depicts plots of an original background gamma radiation spectrum and a depressed gamma radiation spectrum with examples of regions of interest.

FIG. 1 illustrates a model background gamma radiation spectrum as would be measured by a large detection system, e.g. a portal monitor. Plot 10 depicts radiation counts on the Y-axis 12 as a function of gamma radiation energy on the X-axis 14. Two spectra—an "original" background spectrum 16 and a "depressed" spectrum 18 that could be caused by a massive object in the portal are shown. While plot 10 depicts background depression of gamma radiation, a similar phenomenon occurs with any ionizing radiation that is present as background radiation. Background gamma radiation depression is used herein as an example of background depression of any ionizing radiation.

Based on standard techniques for setting alarm levels, in order to detect a radiological source for which gamma radiation is attenuated by shielding, the contribution from a gamma source in (source+shielded background) minus (original background) must exceed a predetermined level in order to trigger the alarm. Since the background spectrum is depressed by shielding, the gamma radiation contribution from the relevant ionizing radiation source must exceed both the alarm level and the loss of counts due to baseline depression. This leads to a much higher effective alarm condition than is desirable. For example, a very effective shield could reduce the gross count from the "source+shielded background" to less than the "original background" thereby rendering the radiological source undetectable by these standard means.

According to various embodiments disclosed herein, several characteristics of the spectra depicted in FIG. 1 may be combined with certain defined features ("regions of interest" [ROIs]) to provide a more effective alarm. Six ROIs," are defined in FIG. 1: ROI(1) 20, ROI(2) 22, ROI(3) 24, ROI(4) 26, ROI(5) 28, and ROI(6) 30. Each ROI represents an ionizing radiation spectral "band" that is defined by two ROI boundaries. For example, ROI(1) 20 is defined by the Y-axis 12 (acting as an ROI boundary) and ROI boundary 32. ROI(2) 22 is defined by ROI boundary 32 and ROI boundary 34. The spacing (measured in keV) between an ROIs two ROI boundaries is termed the "spectral width" of the ROI. The spectral width of an ROI covers a particular energy range. For example, ROI(4) 26 covers an energy range from about 600 keV to about 1200 KeV, thereby having a spectral width of 1200-600=600 keV. ROI(5) 28 covers an energy range from about 1200 keV to about 2400 keV, thereby having a spectral width of 2400-1200=1200 keV.

Referring again to FIG. 1, note that differences between the two spectra, i.e., background spectrum 16 and depressed spectrum 18, decrease with increasing energy. That is, the plots of background spectrum 16 and depressed spectrum 18 get progressively closer together as energy levels increase. This occurs because shielding attenuates lower energy gamma radiation more effectively than higher energy gamma radiation. Also note that for the six ROIs shown in FIG. 1, (i.e., ROI(1) 20, ROI(2) 22, ROI(3) 24, ROI(4) 26, ROI(5) 28, and ROI(6) 30), the sum of counts in any single ROI decreases from background spectrum 16 to depressed spectrum 18 as a result of the spectrum being depressed by the shielding effect.

Figure 2:
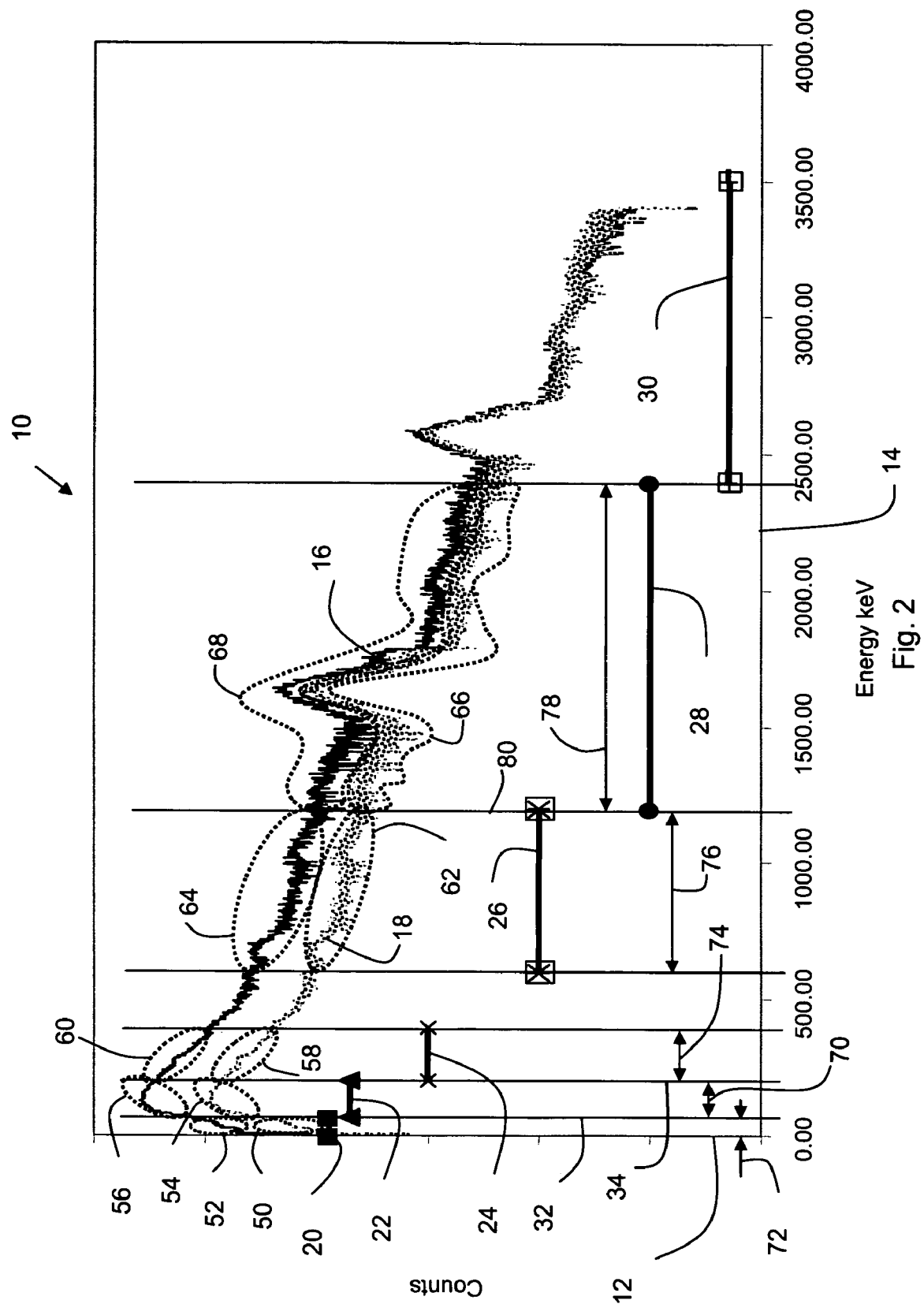
FIG. 2 identifies features of regions of interest depicted in FIG. 1.

FIG. 2 illustrates further useful features that may be used to compensate for the effects of depressed background spectra in radiation detection equipment. Note that while the depressed counts 50 in ROI(1) 20 are smaller in the depressed spectrum 18 than the background counts 52 in original background spectrum 16, the depressed counts 54 in ROI(2) 22 of depressed spectrum 18 also tend to track downward compared with background counts 56 in original background spectrum 16. Therefore ROI(2) 22 may be used as an effective background for ROI(l) 20. Similarly, the depressed counts 58 in ROI(3) 24 are smaller in the depressed spectrum 18 than the original background count 60 in original background spectrum 16, and the depressed counts 62 in ROI(4) 26 are smaller in the depressed spectrum 18 than the original background counts 64 in original background spectrum 16, and the depressed counts 66 in ROI(5) 28 are smaller in the depressed spectrum 18 than the original background counts 68 in original background spectrum 16. In high energy ROI(6) 30 the counts of depressed spectrum 18 are also less than the counts of background spectrum 16, but the difference may be difficult to discern.

Original background counts 52 and 56 in ROI(1) 20 and ROI(2) 22 respectively may be scaled so that the difference rate between them is zero when no source is present, according to Eq'n 2:

$$\text{difference}(1) = \frac{1}{t}\left[\sum ROI(1) - c_1 \cdot \sum ROI(2)\right] \quad [\text{Eq'n 2}]$$

The term $\Sigma ROI(1)$ refers to the summation of original background counts 52 in ROI(1) 20 of background spectrum 16. The term $\Sigma ROI(2)$ refers to the summation of background counts 56 in ROI(2) 22 of background spectrum 16. The term $t$ is a time interval. The constant $c_1$ may be determined from background data when no gamma sources or massive objects or vehicles are present within the portal, as illustrated by Eq'n 3.

$$c_1 = \frac{\sum ROI(1)_{bkgd}}{\sum ROI(2)_{bkgd}} \quad [\text{Eq'n 3}]$$

Note that the subscript "bkgd" is used to emphasize that the constant $c_1$ is calculated using the original background spectrum 16. Also note that the counting time interval drops out of Eq'n 3.

In general, Eq'n 4 applies for any two ROIs, (e.g., ROI(i) and ROI(i+1)).

$$\text{difference}(i) = \frac{1}{t}\left[\sum ROI(i) - c_1 \cdot \sum ROI(i+1)\right] \quad [\text{Eq'n 4}]$$

where $c_i$ is defined by Eq'n 5.

$$c_i = \frac{\sum ROI(i)_{bkgd}}{\sum ROI(i+1)_{bkgd}} \quad [\text{Eq'n 5}]$$

The most preferred ranges for the ROI may be determined by noting that attenuation of gamma radiation by shielding materials is larger at "low" gamma ray energies (0-100 keV, for example) than at "high" gamma ray energies (1000-3000 keV, for example). It is desirable to have the effects of the shielding on the count rates of adjacent ROIs be equal so that the count rates in each ROI are reduced by the same amount. In such circumstances the difference between radiation counts in two ROIs reflects only the radioactivity (if any) present in a "sample" (e.g., a vehicle or other container potentially bearing a relevant ionizing radiation source) being examined because the contribution to the count rates in the ROIs due to baseline depression decreases by equal fractions. The effects of the shielding on the count rates of adjacent ROIs may be equalized by judiciously defining ROI energy ranges having different spectral widths. For example, again referring to FIG. 2, the spectral width 70 of ROI(2) 22 is wider than the spectral width 72 of ROI(1) 20. Specifically, spectral widths 72 and 70 are chosen so that original background count 52 less depressed count 50 is equal to background count 56 less depressed count 54. Similarly, spectral width 74 of ROI(3) may be selected so that background count 56 less depressed count 54 is equal to original background count 60 less depressed count 58. Also, spectral widths 76 and 78 may be judiciously chosen so that original background count 64 less depressed count 62 is equal to original background count 68 less depressed count 66.

In summary, to optimize the configuration of ROIs, ROI spectral widths should increase with increasing energy. This is because the effects of attenuation decrease as gamma energy increases, the gamma emissions of most radiological sources of concern are at lower energies, and the number of counts per (typical) spectrum channel decreases with increasing energy. It is also desirable in some embodiments that the ROIs either abut or overlap. This means that the ROIs are defined in one of two configurations: (1) the upper energy limit of the lower energy ROI is substantially the same energy level as the lower energy limit of the higher energy ROI, or (2) the upper energy limit of the lower energy ROI is slightly higher than the lower energy limit of the upper energy ROI. ROI configuration (1) is illustrated in FIG. 2, where ROI boundary 32 is the upper boundary of ROI (1) 20 and the lower boundary of ROI(2) 22. Similarly ROI boundary 34 is the upper boundary of ROI (2) 22 and the lower boundary of ROI(3) 24. Also, ROI boundary 80 is the upper boundary of ROI(4) 26 and the lower boundary of ROI(5) 28. ROIs that either abut or overlap are said to be ROIs that interface. The principal benefit of having ROIs that interface is that the energy in the vicinity of ROIs associated with a relevant radiological source is fully accounted.

Figure 3:
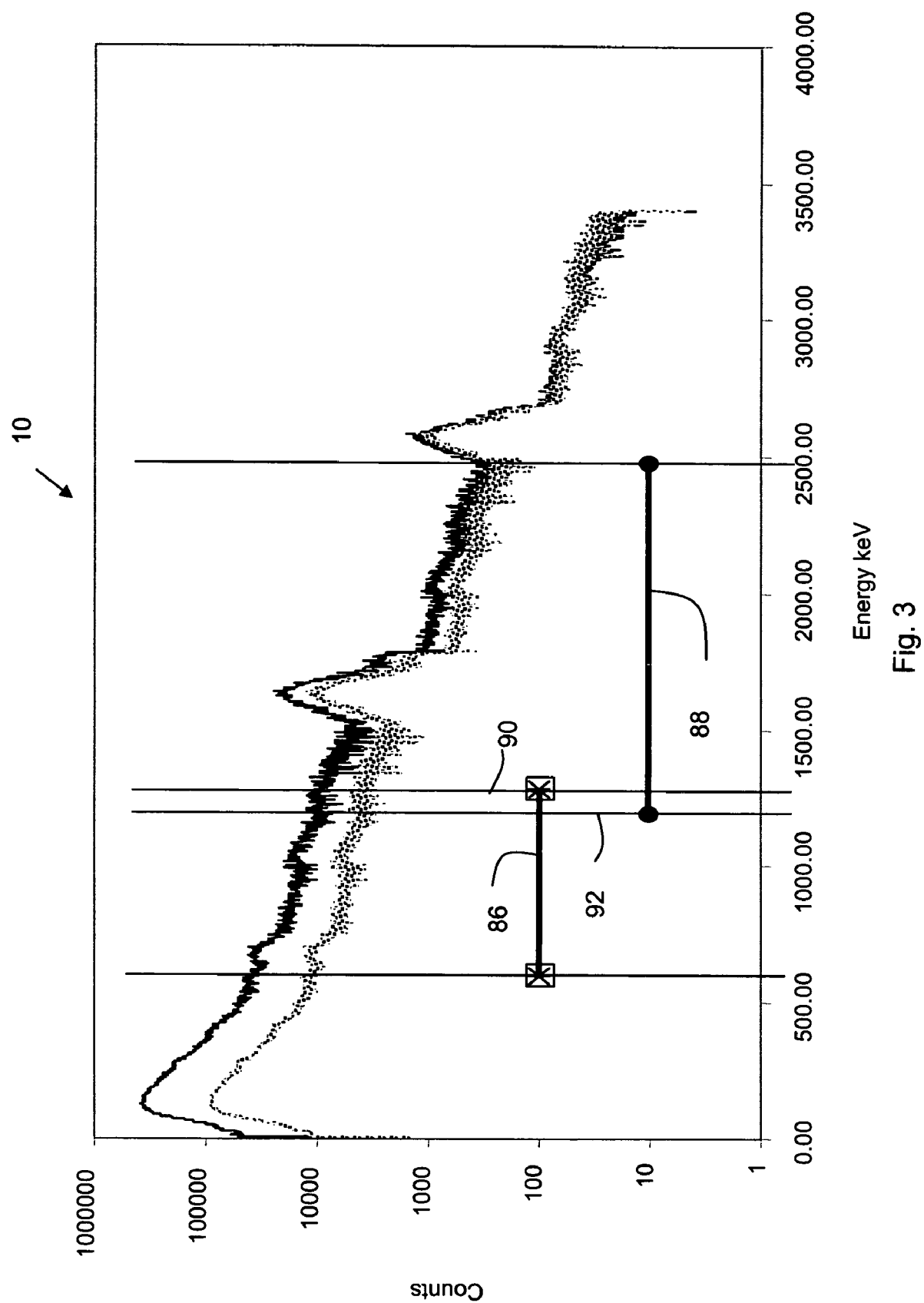
FIG. 3 depicts examples of overlapping regions of interest on the spectral plots of FIG. 1.

FIG. 3 illustrates the previously described "configuration (2)" for ROIs, where the upper energy limit of the lower energy ROI is at a slightly higher energy level than the lower energy limit of the upper energy ROI. In FIG. 3 two new ROIs, ROI(7) 86 and ROI(8) 88 are defined. The upper energy limit of ROI(7) 86 is ROI boundary 90 and the lower energy limit of ROI(8) 88 is ROI boundary 92. ROI boundary 90 is at a slightly higher energy level limit than ROI boundary 92. Even though ROI(7) 86 and ROI(8) 88 overlap, these two radiation energy regions of interest comprise substantially different ionizing radiation spectral bands. Overlapping ROIs are considered to comprise substantially different ionizing radiation spectral bands if the overlap is less than about fifty percent of the spectral width (in keV) of the smaller spectral band. All, some, or none of the ROIs in a particular system may overlap. One ROI that overlaps all regions may be established and the radiation measurement (count) in such ROI may be used to establish a total count rate. In some embodiments where more than two ROIs are established calculations may be stepped through adjacent regions, using paired ROIs, e.g., ROI(1) and ROI(2), then ROI(2) and (ROI(3)), etc.

Table 1 illustrates features of various embodiments described herein for a radiation monitoring portal configured to inspect containers (e.g., vehicles) for relevant potential radiological sources.

TABLE 1

| | | ROI(1) | | ROI(2) | Net Difference |
|---|---|---|---|---|---|
| (I) | Background Only | $B_1$ | – | $c B_2$ | = 0 |
| (II) | Radiological Source and Unshielded Background | $S_1 + B_1$ | – | $c \cdot (S_2 + B_2)$ | $= (S_1 - c \cdot S_2) + (B_1 - c \cdot B_2)$ |
| (III) | Radiological Source and Shielded Background | $S_1 + B_1 - A_1$ | – | $c \cdot (S_2 + B_1 - A_2)$ | $= (S_1 - c S_2) + (B_1 - c B_2) + (A_1 - c A_2)$ |

In particular embodiments, two regions of interest, ROI(1) and ROI(2), are defined in a radiation spectrum. ROI(1) is chosen to include a photopeak, Compton interaction, or other detected emissions from a relevant ionizing radiation source "S." ROI(2) is chosen to have an energy range that falls above the radiation emissions from the relevant ionizing radiation source. Consequently, radiation emitted by the source S increases the count rate in ROI(1) but does not affect the count rate in ROI(2).

Two measurements ($B_1$ and $B_2$) of background radiation (only) are taken over ROI(1) and ROI(2), without the potential radiological source present, or any shielding effects influencing the measurements. A calibration constant "c" is calculated so that $B_1 - c B_2 = 0$. In this condition $B_2$ is said to be "normalized" to $B_1$ by constant c. These conditions are illustrated in line (I) of Table 1.

Then, when a vehicle is in the portal, two measurements are again taken, one over ROI(1) and the other over ROI(2). These measurements represent "total ionizing radiation," meaning that they include both background ionizing radiation and any radiation from a relevant ionizing radiation source "S." For the ideal case (illustrated in Line II of Table 1) in which no baseline depression occurs, there is no attenuation of the background by the vehicle. The measurement in ROI(1) includes any counts (S1) contributed by the source S to ROI (1) from the potential radiological source, plus contributions $B_1$ due to background radiation in ROI(1), giving a total contribution to ROI(1) of ($S_1 + B_1$). Similarly, a measurement is taken over ROI(2) and normalized by constant c, and that measurement is $c \cdot (S_2 + B_2)$. The difference between the count rate in ROI(1) and that in ROI(2) is defined as Eq'n 6.

$$\text{Difference} = [ROI(1)] - c \cdot [ROI(2)] \quad \text{[Eq'n 6]}$$
$$= (S_1 + B_1) - c \cdot (S_2 + B_2)$$
$$= (S_1 - c \cdot S_2) + (B_1 - c \cdot B_2)$$

The previously defined constant c relates the background count rates in ROI(1) and ROI(2) so that ($B_1 - c \cdot B_2$)=0. Furthermore, ROI(2) was selected so that emissions from the potential source S contribute to ROI(1) (as SI) but make no contributions to ROI(2) (i.e., $S_2 = 0$). The substitution of these values in Eq'n 6 yields Eq'n 7.

$$\text{Difference} = (S_1 - c \cdot 0) + 0 \quad \text{[Eq'n 7]}$$
$$= S_1$$

Thus, in the case where no baseline depression occurs, subtracting the normalized radiation count in ROI(2) from the radiation count in ROI(1) yields a radiation count $S_1$ that is equal to the radiation count in ROI(1) that is attributable to relevant potential radiological source "S." Instrumentation imprecision and normal environmental variability may result in a small but non-zero radiation count SI even when no source S is present. Various techniques such as statistical analysis and threshold limiting may be used to determine whether the magnitude of the net difference between the count rate in ROI(1) and that in ROI(2) indicates the presence of source "S."

Radiation measurements from a relevant ionizing radiation source "S" in which a vehicle attenuates the background radiation are summarized in line (III) of Table 1. These measurements represent "total ionizing radiation," meaning that they include any radiation ($S_1$) in ROI(1) from the potential radiological source, plus background radiation in ROI(1) ($B_1$), minus any attenuation ($A_1$) of background radiation in ROI(1) that is attributable to shielding from the vehicle for a total contribution to ROI(1) of $S_1+B_1-A_1$. Similarly, a measurement is taken over ROI(2) and that measurement is $S_2+B_2-A_2$. The two measurements are normalized using constant c and subtracted, and with minor algebraic manipulation, the result is Eq'n 8.

$$\text{Difference}=(S_1-c \cdot S_2)+(B_1-c \cdot B_2)+(A_1-c \cdot A_2) \quad [\text{Eq'n 8}]$$

The term ($B_1-c \cdot B_2$) evaluates to zero by virtue of the prior calculation of the calibration constant c (which forced that term to zero). $A_1$ and $A_2$ are fractions of $B_1$ and $B_2$ respectively due to the nature of radiation attenuation. For example, if shielding by the vehicle caused the background to be reduced by 10%, then $A_1=0.1 \cdot B_1$ and $A_2=0.1 \cdot B_2$. The term ($A_1-c \cdot A_2$) is equivalent to 0.1 * ($B_1-c \cdot B_2$) in the example. Since the term ($B_1-c \cdot B_2$) is zero, the magnitude of the attenuation is irrelevant.

With both the background difference and the attenuation difference of those terms evaluating to zero, this leaves ($S_1-c \cdot S_2$)≈$S_1$, again since ROI(2) was selected so that emissions from the potential source S contribute to ROI(1) (as $S_1$) but make no contributions to ROI(2) so $S_2$≈0). Thus, in the case where baseline depression does occur, subtracting the normalized radiation count in ROI(2) from the radiation count in ROI(1) yields a radiation count ≈$S_1$ that is attributable to relevant potential radiological source "S." That is, the calculated difference yields a value for radiation counts in ROI(1) that is substantially identical to that measured when there is no background attenuation.

It should be noted that equal attenuation is an approximation because radiation attenuation decreases with increasing energy. In particular embodiments ROI ranges are selected so that the attenuations in ROI(1) and ROI(2) are approximately equal. If further ROIs are defined, then a range for ROI(3) may be selected so that the attenuations in ROI(2) and ROI(3) are approximately equal, etc. The reason for preferably varying the ROI energy range widths vs. the average energy within each region is that attenuation changes more rapidly at low energies. Increasing the ROI width with increasing energy also improves measurement statistics as detected count rates vs. energy generally decrease with increasing energy for all radiation sources; increasing the ROI width makes the count rates in all ROIs closer in magnitude.

Further insight into embodiments may be discerned by considering a large vehicle containing a $^{137}$Cs source moving through a portal monitor. $^{137}$Cs emits a gamma radiation at 662 keV. The massive vehicle shields the background radiation from the portal detectors, reducing the [background+vehicle] count rate observed by the portal detectors. Detected radiation due to the $^{137}$CS source hidden in the vehicle is added to the detected radiation due to background sources, but if the vehicle causes substantial background shielding the sum of radiation counts from the shielded background and $^{137}$Cs source may be less than that observed from an empty (unshielded) portal. Thus, an examination of the total count rate might not indicate the presence of any radiation sources in the vehicle due to background ionizing radiation depression, resulting in an ineffective monitoring occurrence.

To overcome such occurrences, two ROIs may be defined, the first covering the energy range of 500-800 keV and the adjacent upper one covering the energy range of 800-1400 keV. Shielding by the vehicle was expected to cause the count rates in both ROIs to decrease. However, radiation from the $^{137}$CS source contributes counts only to the first ROI, (500-800 keV) but not to the adjacent upper ROI (800-1400 keV). Therefore, the difference between the first and second ROIs after normalizing and accounting for the expected effect of attenuation indicates the presence of a $^{137}$Cs radiation source although the total background count rate has been reduced due to shielding by the vehicle.

This method is effective for both medium resolution (e.g. NaI(Tl), CsI(Na)) and low resolution (plastic scintillator) detectors. The spectra of medium resolution contain contributions from a radiation source photopeak (662 keV for $^{137}$Cs) in the appropriate ROI while the spectra of low resolution detectors contains a 'Compton edge' in which counts are added to the ROI beginning at the photopeak energy (e.g. 662 keV for $^{137}$Cs), rising with decreasing energy until the 'classical' Compton edge energy (476 keV for $^{137}$Cs) where the contribution is approximately constant down to the minimum energy recorded in the spectrum.

A special case may be applied to the highest energy range ROI for medium resolution detectors. Radiation sources which emit gamma radiation that would be observed in only the highest energy ROI cannot be monitored by the previously-described difference methods because there is no adjacent ROI on the upper energy side of the highest energy range ROI. If the detector resolution is such that gamma emitters generate a photopeak in the highest energy range ROI, then the difference between this ROI and the adjacent lower energy range ROI may be used as an indication of gamma radiation from these sources. The practicality of this method is reduced with low resolution detectors whose output does not produce a distinct photopeak in the spectrum.

EXAMPLE

Figure 4:
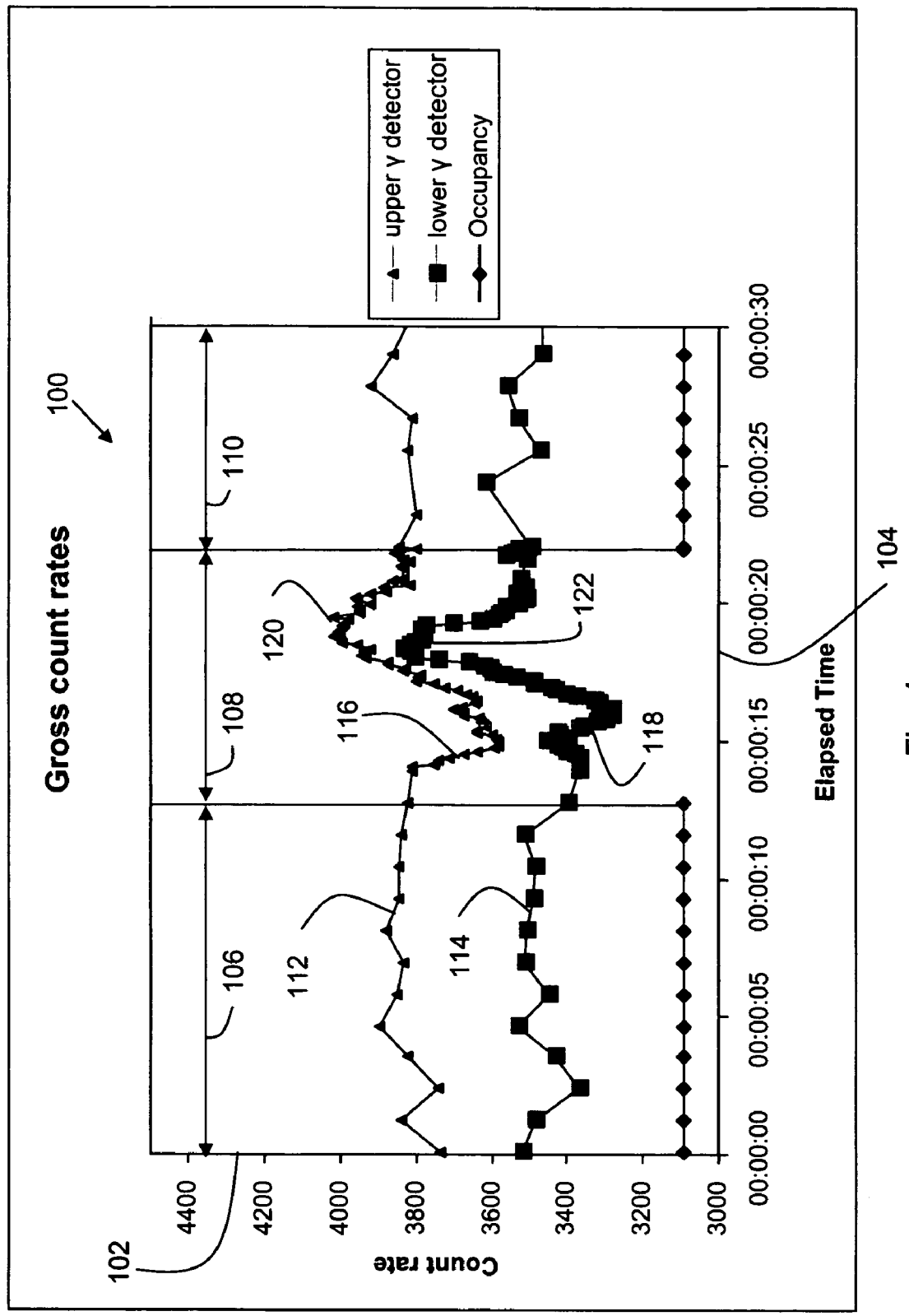
FIG. 4 depicts gross count rates over time from two detectors in a hypothetical portal radiation monitoring system.

The following example illustrates an after-the-fact analysis of spectra measured at a hypothetical portal monitoring test as a $^{76}$Ga source in a stake bed truck that passed through the portal. The postulated spectra are examined first using simple gross count rates (the sum of detected gamma radiation at all energies). Two example plots of detection vs. time are shown in FIG. 4. Plot 100 shows a plot of postulated gross count rates plotted on the Y-axis 102 versus an elapsed time of approximately thirty seconds on the X-axis 104. Time span 106 represents an interval before the truck entered the portal, time span 108 represents an "occupancy interval" during which the truck was in the portal, and time span 110 represents a time span after the truck left the portal. Plot 112 shows postulated gross counts (0-3000 keV) from an "upper gamma detector" covering a field of view from 2.5 to 5 m above the ground and plot 114 shows postulated gross counts (0-3000 keV) from a "lower gamma detector" covering a field of view from 0 to 2.5 m above the ground. Baseline depressions 116 and 118 are visible for plots 112 and 114 respectively at the beginning of occupancy time span 108 as the truck engine moves through the portal. That is, postulated gross count rates show initially a decrease in rate as the vehicle with the radiation source moves into the portal. However, since the $^{76}$Ga source contained significant radioactivity, detected count rates are expected to eventually increase above the rate observed for an 'empty' portal as indicated in regions 120 and 122 of plots 112 and 114 respectively, although the difference between the 'occupied' and unoccupied' rates was reduced due to shielding by the truck.

Figure 5:
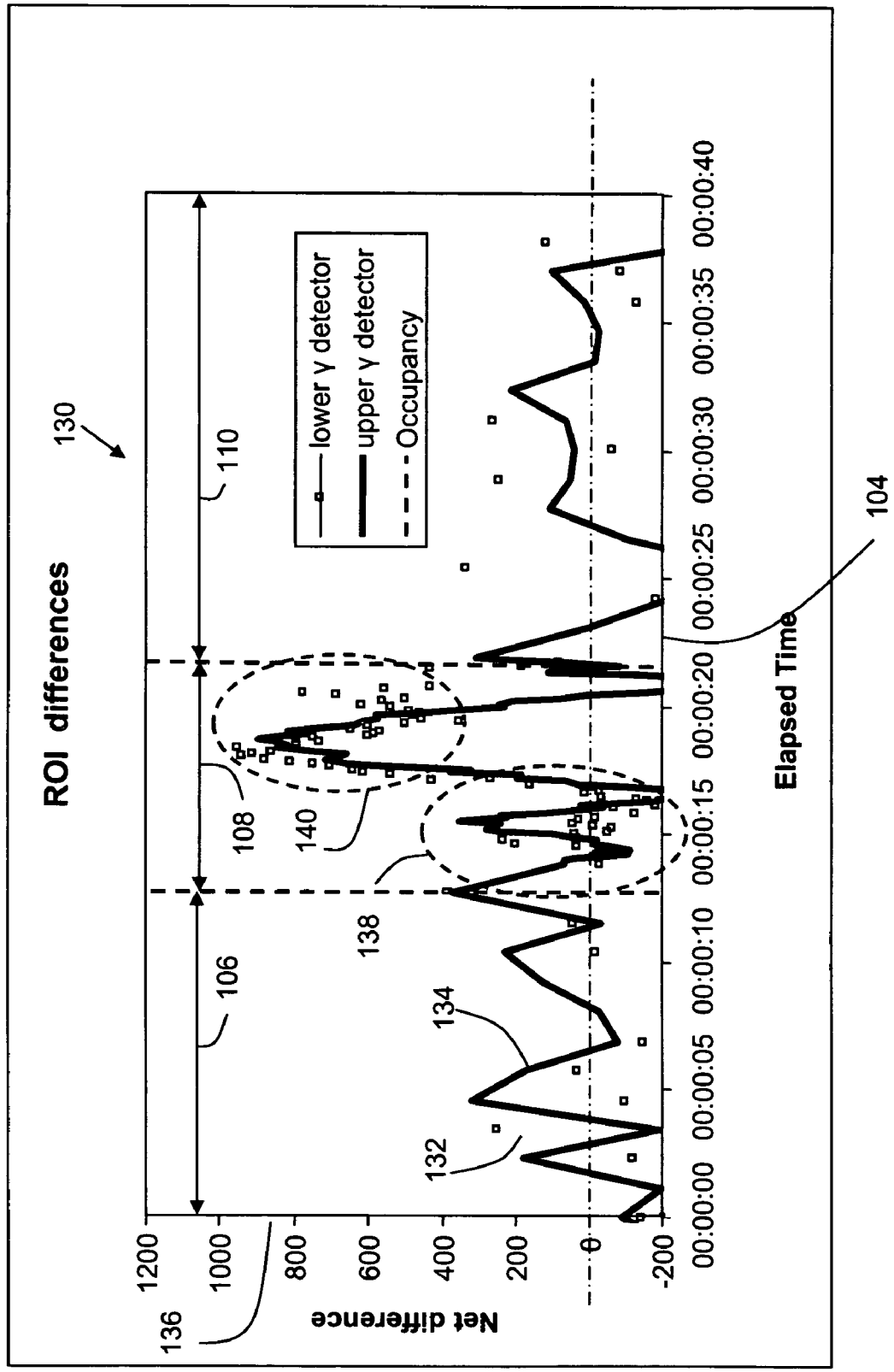
FIG. 5 depicts differences in counts in spectral regions of interest for each of the two detectors in the hypothetical portal radiation monitoring system reporting the data of FIG. 4.

Graph 130 in FIG. 5 shows plots 132 and 134 that represent postulated data from the lower gamma detector and the upper gamma detector respectively, showing plots of the differences between two adjacent ROIs for both detectors as the truck and source moved through the portal. The net differences between ROIs are plotted on a Y-Axis 136 versus time using the same X-axis 104 used in FIG. 4, but showing a postulated data for approximately forty seconds. During time span 106 before the truck enters the portal the postulated net difference counts for both detectors center substantially around zero. Furthermore, when the truck enters the portal no effect from shielding by the truck is anticipated, as indicated by region 138 of the plots. However, as illustrated by region 140, statistically significant increases in the ROI net differences are anticipated immediately after the radiation source enters the portal, illustrating the benefit of methods described herein. In addition to using statistical analysis techniques, other techniques such as (1) setting alarm levels based on peak detected net differences, (2) using time/rate algorithms, and (3) detector "voting" may be used to determine if the net difference measurement is indicative of the presence of the relevant ionizing radiation source ($^{76}$Ga in this case).

Figure 6:
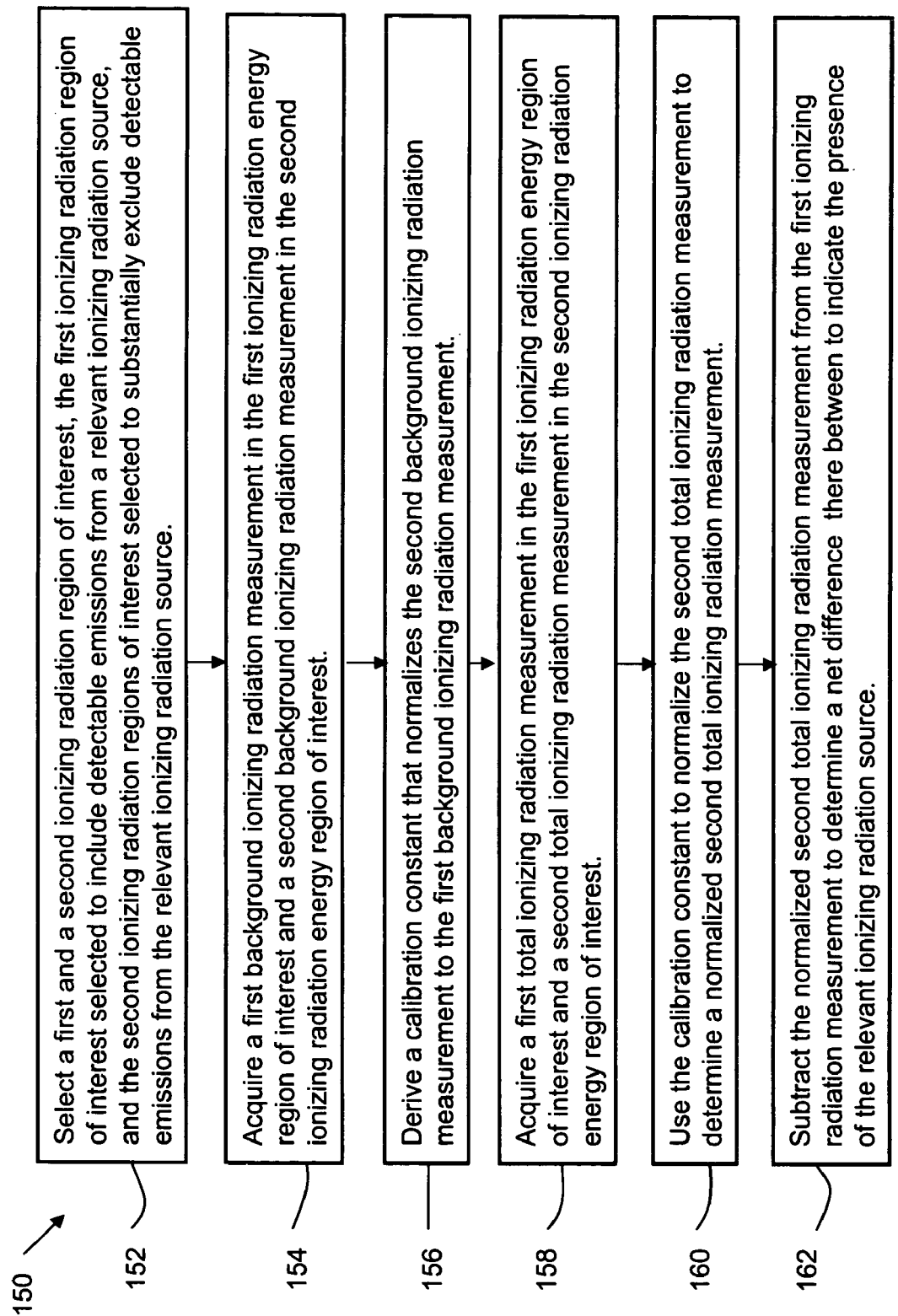
FIG. 6 presents a flow chart of a method embodiment.

FIG. 6 illustrates a flow chart 150 provided to describe an embodiment of a method of detection of a relevant ionizing radiation source. In step 152 a first and a second ionizing radiation region of interest are selected. The first ionizing radiation region of interest is selected to include detectable emissions from a relevant ionizing radiation source, and the second ionizing radiation region of interest is selected to substantially exclude detectable emissions from the relevant ionizing radiation source. In step 154, a first background ionizing radiation measurement in the first ionizing radiation energy region of interest is acquired, and a second background ionizing radiation measurement in the second ionizing radiation energy region of interest is also acquired. A calibration constant that normalizes the second background ionizing radiation measurement to the first background ionizing radiation measurement is derived in step 156. Then in step 158 a first total ionizing radiation measurement in the first ionizing radiation energy region of interest is acquired, and a second total ionizing radiation measurement in the second ionizing radiation energy region of interest is also acquired. The calibration constant from step 156 is used to normalize the second total ionizing radiation measurement to determine a normalized second total ionizing radiation measurement in step 160, and then in step 162 the normalized second total ionizing radiation measurement is subtracted from the first ionizing radiation measurement to determine a net difference there between to indicate the presence of the relevant ionizing radiation source.

FIG. 7 illustrates a mechanical schematic of apparatus embodiment. Depicted there is a radiation analysis system 200 for detection of radiation from a relevant ionizing radiation source in a background radiation environment. Radiation analysis system 200 has a radiation detector 210 that is exposed to ambient radiation. The term ambient radiation refers to radiation in at least a portion of the vicinity of radiation analysis system 200. Ambient radiation includes both natural background radiation and radiation from man-made emitters. Radiation detector 210 is configured to detect at least a first and a second ROI, where the first ionizing radiation region of interest includes detectable emissions from the relevant ionizing radiation source and the second ionizing radiation region of interest excludes substantial emissions from the relevant ionizing radiation source.

Radiation analysis system 200 also has a triggering system 220. Triggering system 220 is configured to generate a first data acquisition trigger when the radiation detector 210 is exposed to ambient radiation comprising the background radiation environment, at a time when the environment surrounding radiation analysis system 200 is controlled to ensure that no radiation from the relevant ionizing radiation source is included in the ambient radiation That is, the first data acquisition trigger is actuated for the purpose of measuring background radiation only in at least a portion of the space around radiation analysis system 200. Triggering system 220 is also configure to generate a second data acquisition trigger when the detector is exposed to ambient radiation comprising the background radiation environment and a potentially shielded relevant ionizing radiation source. That is, the second data acquisition trigger is actuated for the purpose of testing that portion of the space around radiation analysis system 200 for any presence of the relevant ionizing radiation source material. Triggering system 220 may be actuated manually or automatically, or by a combination of manual and automatic events.

Radiation analysis system 200 further includes a data acquisition system 230 that is in operable communication with the radiation detector 210 and with the triggering system 220. It shall be understood that the term "in operable communication with" refers to direct or indirect communication of suitable signals between two elements, either directly or indirectly through one or more intermediate elements. The data acquisition system 230 is configured to acquire from the radiation detector a background radiation measurement set after the triggering system 220 generates the first data acquisition trigger. The background radiation measurement set includes a first background ionizing radiation measurement in the first ionizing radiation region of interest and a second background ionizing radiation measurement in the second ionizing radiation region of interest. The data acquisition system 230 is further configured to acquire from the radiation detector 210 a test radiation measurement after the triggering system generates the second data acquisition trigger. The test radiation measurement includes a first total ionizing radiation measurement in the first ionizing radiation region of interest and a second total ionizing radiation measurement in the second ionizing radiation region of interest. The term total ionizing radiation measurement refers to a radiation measurement that includes background ionizing radiation as well as any radiation from a relevant ionizing radiation source that potentially is contributing to the ambient radiation measured by the radiation detector 210. Data acquisition system 230 typically incorporates a spectrum analyzer to interpret signals from the radiation detector 210 and derive the first background ionizing radiation measurement, the second background ionizing radiation measurement, the first total ionizing radiation measurement, and the second total ionizing radiation measurement.

The radiation analysis system 200 also has a computer 240 that is in operable communication with the data acquisition system 230. The computer 240 is configured to normalize the second background ionizing radiation measurement to the first background ionizing radiation measurement to determine a calibration constant. The computer 240 is also configured to apply the calibration constant to normalize the second total ionizing radiation measurement to determine a normalized second total ionizing radiation measurement and the computer 240 is configured to subtract the normalized second total ionizing radiation measurement from the first total ionizing radiation measurement to determine a net difference there between to indicate whether the relevant ionizing radiation source is present. The computer 240 may be further configured to analyze whether the net difference indicates the presence of the relevant ionizing radiation source at a confidence level that warrants activating an alarm.

The foregoing descriptions of embodiments of this invention have been presented for purposes of illustration and exposition. They are not intended to be exhaustive or to limit the invention to the precise forms disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for detecting a relevant ionizing radiation source in an environment that includes a potential background ionizing radiation shielding material positioned to obstruct the detection, the method comprising:
   (a) selecting at least a first and a second ionizing radiation energy region of interest wherein:
      the first and the second ionizing radiation energy regions of interest each have a spectral width, and
      the first ionizing radiation region of interest is selected to include detectable emissions from the relevant ionizing radiation source, and
      the second ionizing radiation region of interest is selected to have an energy range that does not have substantial emissions from the relevant ionizing radiation source;
   (b) acquiring a first background ionizing radiation measurement in the first ionizing radiation energy region of interest and a second background ionizing radiation measurement in the second ionizing radiation energy region of interest, each of the first background ionizing radiation and the second background ionizing radiation measurements being taken substantially in the absence of the relevant ionizing radiation source;
   (c) normalizing the second background ionizing radiation measurement to the first background ionizing radiation measurement to determine a calibration constant;
   (d) acquiring a first total ionizing radiation measurement in the first ionizing radiation energy region of interest and a second total ionizing radiation measurement in the second ionizing radiation energy region of interest, each of the first total ionizing radiation and the second total ionizing radiation measurements being taken in the presence of a potential relevant radiological source and in the presence of a potential background ionizing radiation shielding material positioned to obstruct the detection of the potential relevant ionizing radiation source;
   (e) applying the calibration constant to normalize the second total ionizing radiation measurement to determine a normalized second total ionizing radiation measurement; and
   (f) subtracting the normalized second total ionizing radiation measurement from the first total ionizing radiation measurement to determine a net difference there between to indicate the presence of the relevant ionizing radiation source.

2. The method of claim 1 wherein the first ionizing radiation region of interest is selected to include detectable emissions from the relevant ionizing radiation source substantially at a radiation source photopeak of the relevant ionizing radiation source.

3. The method of claim 1 wherein the first ionizing radiation region of interest is selected to include detectable emissions from the relevant ionizing radiation source substantially at a Compton edge for the relevant ionizing radiation source.

4. The method of claim 1 wherein the first and the second ionizing radiation energy regions of interest are further selected so that the first ionizing radiation region of interest substantially comprises energy that is lower than energy comprising the second ionizing radiation region of interest.

5. The method of claim 1 wherein the spectral width of the first ionizing radiation energy region of interest is further selected so that the second ionizing radiation region of interest has a spectral width that is greater than the spectral width of the first ionizing radiation region of interest.

6. The method of claim 1 wherein the first ionizing radiation region of interest and the second ionizing radiation region of interest are selected to interface.

7. The method of claim 6 wherein the first ionizing radiation region of interest is selected to include detectable emissions from the relevant ionizing radiation source substantially at a radiation source photopeak of the relevant ionizing radiation source.

8. The method of claim 6 wherein the first ionizing radiation region of interest is selected to include detectable emissions from the relevant ionizing radiation source substantially at a Compton edge for the relevant ionizing radiation source.

9. The method of claim 6 wherein the first and the second ionizing radiation energy regions of interest are further selected so that the first ionizing radiation region of interest substantially comprises energy that is lower than energy comprising the second ionizing radiation region of interest.

10. The method of claim 6 wherein the spectral width of the first ionizing radiation energy region of interest is further selected so that the second ionizing radiation region of interest has a spectral width that is greater than the spectral width of the first ionizing radiation region of interest.

11. The method of claim 6 wherein the first and the second ionizing radiation energy region of interest are selected such that the attenuation expected from the potential background radiation shielding material in the first ionizing radiation region of interest is approximately equal to the attenuation expected from the potential background radiation shielding material in the second ionizing radiation region of interest.

12. The method of claim 11 wherein the first ionizing radiation region of interest is selected to include detectable emissions from the relevant ionizing radiation source at a radiation source photopeak of the relevant ionizing radiation source.

13. The method of claim 11 wherein the first ionizing radiation region of interest is selected to include detectable emissions from the relevant ionizing radiation source substantially at a Compton edge for the relevant ionizing radiation source.

14. The method of claim 11 wherein the first and the second ionizing radiation energy regions of interest are further selected so that the first ionizing radiation region of interest substantially comprises energy that is lower than energy comprising the second ionizing radiation region of interest.

15. The method of claim 11 wherein the spectral width of the first ionizing radiation energy region of interest is further selected so that the second ionizing radiation region of interest has a spectral width that is greater than the spectral width of the first ionizing radiation region of interest.

16. The method of claim 1 wherein the first and the second ionizing radiation energy region of interest are selected such that the attenuation expected from the potential background radiation shielding material in the first ionizing radiation region of interest is approximately equal to the attenuation expected from the potential background radiation shielding material in the second ionizing radiation region of interest.

17. The method of claim 16 wherein the first ionizing radiation region of interest is selected to include detectable emissions from the relevant ionizing radiation source substantially at a radiation source photopeak of the relevant ionizing radiation source.

18. The method of claim 16 wherein the first ionizing radiation region of interest is selected to include detectable emissions from the relevant ionizing radiation source substantially at a Compton edge for the relevant ionizing radiation source.

19. The method of claim 16 wherein the first and the second ionizing radiation energy regions of interest are further selected so that the first ionizing radiation region of interest substantially comprises energy that is lower than energy comprising the second ionizing radiation region of interest.

20. The method of claim 16 wherein the spectral width of the first ionizing radiation energy region of interest is further selected so that the second ionizing radiation region of interest has a spectral width that is greater than the spectral width of the first ionizing radiation region of interest.

21. A radiation analysis system for detection of radiation from a relevant ionizing radiation source in a background radiation environment, the apparatus comprising:
   a radiation detector exposed to ambient radiation, the radiation detector configured to detect at least a first and a second ionizing radiation region of interest, wherein the first ionizing radiation region of interest includes detectable emissions from the relevant ionizing radiation source and the second ionizing radiation region of interest substantially excludes emissions from the relevant ionizing radiation source;
   a triggering system configured to generate a first data acquisition trigger when the detector is exposed to ambient radiation comprising the background radiation environment without radiation from the relevant ionizing radiation source and configured to generate a second data acquisition trigger when the detector is exposed to ambient radiation comprising the background radiation environment and a potentially shielded relevant ionizing radiation source;
   a data acquisition system in operable communication with the radiation detector and with the triggering system, wherein:
      the data acquisition system is configured to acquire from the radiation detector a background radiation measurement after the triggering system generates the first data acquisition trigger, the background radiation measurement comprising a first background ionizing radiation measurement in the first ionizing radiation region of interest and a second background ionizing radiation measurement in the second ionizing radiation region of interest, and
      the data acquisition system is further configured to acquire from the radiation detector a test radiation measurement after the triggering system generates the second data acquisition trigger, the test radiation measurement comprising a first total ionizing radiation measurement in the first ionizing radiation region of interest and a second total ionizing radiation measurement in the second ionizing radiation region of interest; and
   a computer in operable communication with the data acquisition system, the computer configured to normalize the second background ionizing radiation measurement to the first background ionizing radiation measurement to determine a calibration constant, and configured to apply the calibration constant to normalize the second total ionizing radiation measurement to determine a normalized second total ionizing radiation measurement and configured to subtract the normalized second total ionizing radiation measurement from the first total ionizing radiation measurement to determine a net difference there between to indicate the presence of the relevant ionizing radiation source.

22. The radiation analysis system of claim 21 wherein the radiation detector comprises a medium resolution radiation detector.

23. The radiation analysis system of claim 21 wherein the radiation detector comprises a low resolution radiation detector.

* * * * *